United States Patent [19]

Burchard et al.

[11] 3,951,931
[45] Apr. 20, 1976

[54] PRODUCTION OF POLYMERIC COMPOUNDS HAVING FUNCTIONAL END GROUPS

[75] Inventors: Walther Burchard, Gundelfingen; Helmut Eschwey, Merzhausen, both of Germany

[73] Assignee: BASF Aktiengesellschaft, Ludwigshafen (Rhine), Germany

[22] Filed: Sept. 9, 1974

[21] Appl. No.: 504,286

[30] Foreign Application Priority Data
June 10, 1974 Germany............................ 2427956

[52] U.S. Cl.............................. 260/879; 260/63 R; 260/79.5 NV; 526/24 D; 526/336; 526/392; 260/885; 260/886
[51] Int. Cl.$^2$................ C08F 210/00; C08F 212/00; C08L 9/00; C08L 147/00
[58] Field of Search....................... 260/88.2 C, 879

[56] References Cited
UNITED STATES PATENTS

| | | | |
|---|---|---|---|
| 3,644,322 | 2/1972 | Farrar............................... | 260/94.2 |
| 3,652,516 | 3/1972 | Farrar............................... | 260/83.7 |
| 3,787,510 | 1/1974 | Farrar............................... | 260/665 R |

FOREIGN PATENTS OR APPLICATIONS

| | | |
|---|---|---|
| 854,706 | 9/1952 | Germany |
| 985,614 | 3/1965 | United Kingdom |
| 1,225,863 | 9/1966 | Germany |
| 1,225,864 | 9/1966 | Germany |

OTHER PUBLICATIONS

Worsfold et al., Canadian J. of Chemistry, 1969, 47, 3379–3385.
SWARC, Proceedings Royal Society, Series A, 1964, 279, pp. 260–290.
Morton in "Vinyl Polymerization" Part II (Marcel Dekker) – 1969, pp. 211–229.
Forman in "Polymer Chemistry of Synthetic Elastomers" Part II (Interscience) – 1969, pp. 491–596.

*Primary Examiner*—Harry Wong, Jr.
*Assistant Examiner*—A. L. Clingman
*Attorney, Agent, or Firm*—Johnston, Keil, Thompson & Shurtleff

[57] ABSTRACT

A process for the manufacture of polymeric compounds which have any desired number of functional end groups. In this process, polyfunctional organoalkali metal compounds which have been manufactured by reaction of divinylbenzene with low molecular weight organoalkali metal compounds, are reacted direct, or after prior reaction with anionically polymerizable monomers, with reactive low molecular weight compounds. The polymeric compounds which have functional end groups can be employed, for example, as emulsifiers, secondary dispersions, secondary dispersing agents or polymeric carrier substances.

2 Claims, 1 Drawing Figure

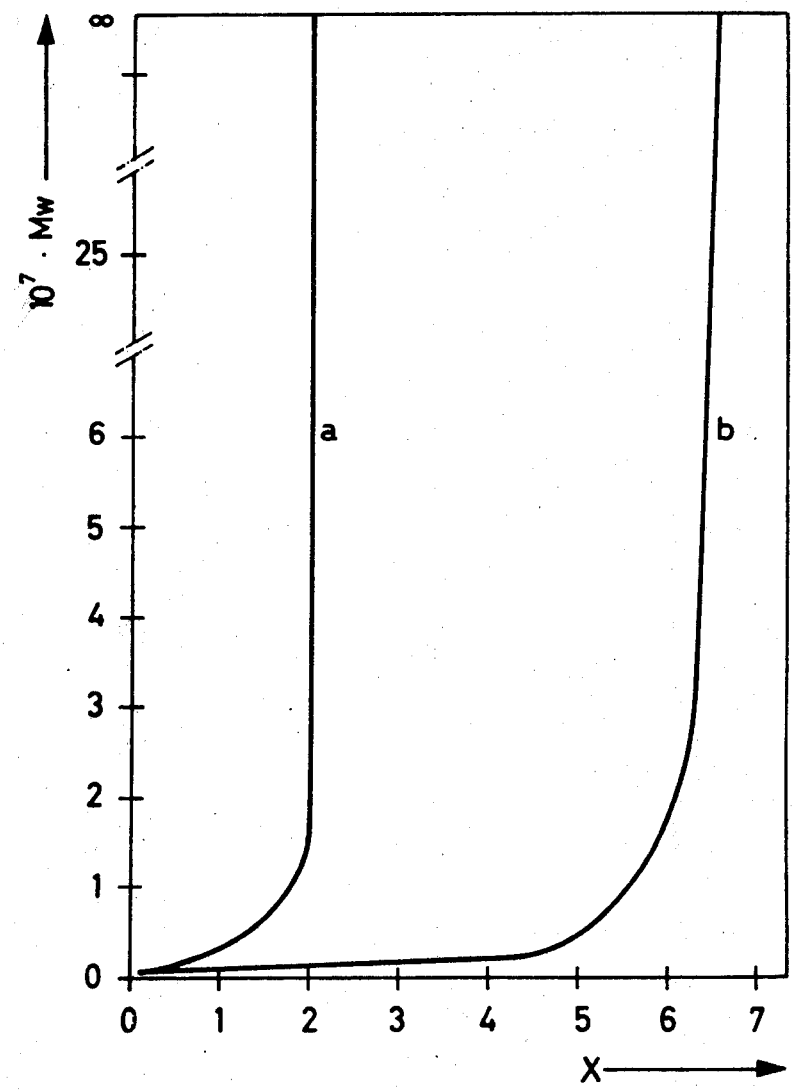

PRODUCTION OF POLYMERIC COMPOUNDS HAVING FUNCTIONAL END GROUPS

Reactions of organometallic compounds with reactive low molecular weight compounds, which make it possible to introduce certain functional groups, for example hydroxyl or carboxyl groups, into the organometallic compound by substitution of the metal atom, have been known for a long time. Thus, polymers which have functional end groups can be prepared in a defined manner if polymers which have terminal alkali metal-carbon bonds, so-called "living" polymers, are reacted with reactive low molecular weight compounds, such as, say, carbon dioxide. German patent specification No. 854,706 describes examples of such reactions. Polymers which have a low, and limited, number of functional end groups are obtained by such a process.

We have now found that polymeric compounds which have any desired number of functional end groups can be prepared in a defined manner if divinylbenzene is reacted with low molecular weight organoalkali metal compounds under defined conditions and the reaction product is then reacted with the reactive low molecular weight compounds.

Accordingly, the invention is concerned with a process for the manufacture of polymeric compounds which have any desired number of functional end groups, by reaction of polymeric organoalkali metal compounds with reactive low molecular compounds, wherein (I) a. divinylbenzene or mixtures of divinylbenzene with monovinylaromatic compounds and b. low molecular weight organoalkali metal compounds of up to 50 carbon atoms in the organic radical are reacted with one another in inert organic solvents, the content of divinylbenzene in the reaction mixture not exceeding 2.5 per cent by weight, based on the reaction mixture, and the molar ratio of divinylbenzene to the alkali metal content of the low molecular weight organoalkali metal compound being from 0.5:1 to 20:1, and thereafter (II) the polymeric, polyfunctional organoalkali metal compounds thus obtained are reacted, direct or after prior reaction with anionically polymerizable monomers, with the reactive low molecular weight compounds, the molar ratio of the alkali metal content of the polymeric, polyfunctional organoalkali metal compound to the reactive low molecular compound being equal or less than 1:1.

According to the invention, divinylbenzene is first reacted with low molecular weight organoalkali metal compounds. All three isomers of divinylbenzene, namely o-, m- and p-divinylbenzene, can be used for this purpose. The isomers can equally well be employed individually or as mixtures with one another. It is advantageous to use divinylbenzene as a mixture with monovinyl-aromatic compounds. Suitable monovinylaromatic compounds are particularly styrene and/or ethylvinylbenzene. However, monovinylaromatic compounds are to be understood as also including the side-chain-substituted compounds, such as α-methylstyrene. The content of divinylbenzene in this mixture is a rule from 10 to 80 per cent by weight and preferably from 30 to 60 per cent by weight, based on the mixture.

Low molecular weight organoalkali metal compounds are to be understood as compounds of which the organic radical contains up to 50 carbon atoms. They can be monofunctional or polyfunctional. The organolithium compounds have proved particularly advantageous. All known low molecular weight compounds of this nature can be employed. Ethyl lithium, butyl lithium, phenyl lithium or tetrameric lithium-α-methylstyrene may be mentioned as examples. Butyl lithium is preferred and sec.-butyl lithium is particularly advantageous.

The organometallic compounds of sodium and of potassium are equally suitable. All the compounds of sodium and potassium which are known, and have been described, as initiators of anionic polymerization can be used. Cumyl sodium, cumyl potassium, sodium naphthalene and tetrameric α-methylstyrene-disodium, as well as tetrameric α-methylstyrene-dipotassium may be mentioned as examples of these.

The reaction of divinylbenzene with the low molecular weight organoalkali metal compound is carried out in high dilution in inert organic solvents as the reaction medium. Suitable solvents of this type are cycloaliphatic hydrocarbons, such as cyclohexane, cycloheptane and decahydronaphthalene; aromatic hydrocarbons, such as benzene, toluene, xylene or tetrahydronaphthalene, or mixtures thereof. It is also possible to use as solvents, the linear and cyclic ethers which are conventionally used for reactions of organometallic compounds, such as diethyl ether, dimethoxyethane, phenyl methyl ether, tetrahydrofuran and dioxane. The ethers can be employed individually or as a mixture with inert hydrocarbon solvents. The reaction temperature is as a rule from −100°C to +100°C and depends, in general, on the solvent chosen.

The reaction can be carried out, according to choice, in such a way that the polyfunctional alkali metalorganic compounds which are formed are soluble or partly soluble or completely insoluble in the inert organic solvents which serve as the reaction medium. Products consisting of molecules which are in themselves crosslinked, but are still soluble, are also designated, in the remainder of the text, as microgels. The insoluble products are intermolecularly crosslinked macro-gels. The preference given in the choice of reaction conditions depends on the subsequent use of the polymeric compounds, according to the invention, which have functional end groups. Although the crosslinked products of a macro-gel nature are advantageous for special applications, the soluble compounds are usually preferred.

The factors which are of decisive importance for the course of the reaction of divinylbenzene with the low molecular weight organoalkali metal compounds are the concentration of divinylbenzene in the reaction mixture and the ratio of divinylbenzene to low molecular weight organoalkali metal compound used in the reaction. The concentration of the pure divinylbenzene should be not more than 2.5 per cent by weight, based on the reaction mixture. Whilst higher concentrations of divinylbenzene are possible, such concentrations of divinylbenzene are possible, such concentrations predominantly give crosslinked products of a macro-gel nature which are no longer soluble.

The ratio of divinylbenzene to low molecular weight organoalkali metal compound used in the reaction decides the molecular weight, the degree of crosslinking — and therefore the solubility — and the number of alkali metal-carbon groups of the polyfunctional organoalkali metal compound, for a given concentration of divinylbenzene in the reaction mixture. The chosen value of this ratio, or the limits within which it can be varied, depends primarily on the degree of dilution of the reaction mixture, that is to say on the concentration of the divinylbenzene.

A molar ratio of divinylbenzene to alkali metal content of the low molecular weight organoalkali metal compound of 0.5:1 usually represents the lower limit. A lower ratio is disadvantageous and serves no purpose, since under those conditions an unnecessary excess of low molecular weight organoalkali metal compound is employed.

The larger the chosen molar ratio of the divinylbenzene to the alkali metal content of the low molecular weight organoalkali metal, the higher is the number of alkali metal-carbon bonds per molecule of the reaction product, the molecular weight of the latter and its degree of crosslinking. Above a certain limiting ratio, partial or complete intermolecular crosslinking occurs, with formation of insoluble macro-gels. The ratio of the two reactants at which complete crosslinking occurs depends on the concentration of the divinylbenzene in the reaction mixture. The limit is the higher, the lower the concentration of divinylbenzene.

This relationship is made clear in the accompanying drawing. The molar ratio X of divinylbenzene to the alkali metal content of the low molecular weight organoalkali metal compound (butyl lithium) is plotted on the abscissa and the average molecular weight $M_w$ of the reaction product (determined as a weight average by the light scattering method) is plotted on the ordinate. Curve (a) shows the course of the reaction for a reaction mixture containing 2.5 per cent by weight of pure divinylbenzene, based on the reaction mixture, whilst curve (b) applies to a reaction mixture which contains 1.25 per cent by weight of pure divinylbenzene, based on the reaction mixture. At the value of X at which the curves run steeply upwards or, more precisely, at the value of X at which the molecular weight of the reaction product approaches infinity, complete crosslinking occurs, with formation of a macro-gel. It can be seen that the upper limit of the molar ratio of divinylbenzene to the alkali metal content of the low molecular weight organoalkali metal compound is 2:1 in the case of curve (a) (2.5% strength solution) and 6.7:1 in the case of curve (b) (1.25% strength solution).

The lower the chosen content of divinylbenzene in the reaction mixture, the higher are the values which this limiting ratio assumes. A molar ratio of divinylbenzene to alkali metal content of the low molecular weight organoalkali metal compound of 20:1 can be viewed as a sensible upper limit. Admittedly, a molar ratio greater than 20:1 is still feasible; however, if at such a ratio soluble reaction products are still desired, the reaction of divinylbenzene with the low molecular weight organoalkali metal compound must be carried out at such extremely high dilution that the reaction becomes technically too involved and therefore of no interest.

The preferred molar ratios of divinylbenzene to alkali metal content of the low molecular weight organoalkali metal compound are from 0.5:1 to 10:1.

In other respects, the reaction of divinylbenzene and the low molecular weight organoalkali metal compounds is carried out under such conditions, for example in an inert gas atmosphere and with the exclusion of moisture, as are conventionally used, and generally known, for reactions of organometallic compounds with ethylenically unsaturated substances.

The reaction of divinylbenzene and the low molecular weight organoalkali metal compounds in the inert organic solvents leads to complete conversion of the reactants, that is to say the reaction products have a composition which has the same molar ratio of divinylbenzene to alkali metal as the reaction mixture. Polymeric, polyfunctional organoalkali metal compounds are obtained in this way. The soluble reaction products normally have a molecular weight of 500 to 10,000,000. These values are weight averages $\overline{M}_w$, determined by the light scattering method. However, it is also possible to obtain products which are still soluble even at a substantially higher molecular weight, for example an $\overline{M}_w$ of 250,000,000. The intrinsic viscosity $[\eta]$ is less than 50 cm³/g, preferably less than 20 cm³/g.

The number of alkali metal-carbon bonds in the polymeric, polyfunctional organoalkali metal compounds can be varied as desired through the choice of the reaction conditions used in the manufacturing process. On average, the polymeric, polyfunctional organoalkali metal compounds contain at least 2 alkali metal-carbon bonds per molecule. As has already been mentioned, a low content of alkali metal-carbon bonds results at a low molar ratio of divinylbenzene to alkali metal content of the low molecular weight organoalkali metal compound in the reaction mixture, for example a ratio of 0.5:1 or 1:1. If this ratio is increased, the number of alkali metal-carbon bonds can be increased as desired. Thus, it is possible to manufacture polymeric, polyfunctional organoalkali metal compounds with far in excess of 10,000 alkali metal-carbon bonds per molecule. The number of alkali metal-carbon bonds per molecule, $p$, can be calculated simply from the following relationship:

$$p = \frac{\overline{P}_n}{[DVB]/[Me^{(+)}]}$$

Herein, $\overline{P}_n$ is the degree of polymerization of the polymeric, polyfunctional organoalkali metal compound, and $[DVB]/[Me^+]$ is the molar ratio of divinylbenzene to the alkali metal content of the low molecular weight organoalkali metal compound.

According to a particular embodiment of the process according to the invention, these polymeric, polyfunctional organoalkali metal compounds can be first reacted, prior to the reaction with the reactive low molecular weight compounds, with anionically polymerizable monomers. Examples of suitable anionically polymerizable monomers are styrene, α-methylstyrene, vinyltoluene, butadiene, isoprene, dimethylbutadiene, methyl methacrylate, 2-vinylpyridine, 4-vinylpyridine and others. The reaction is carried out under the conventional and generally known conditions for anionic polymerization with organoalkali metal initiators. Polymers of star-shaped structure having terminal alkali metal-carbon bonds in the side branches are obtained. Since each alkali metal-carbon bond of the polymeric, polyfunctional organoalkali metal compound initiates the polymerization of a side branch, the number of star-shaped side branches corresponds to the number of alkali metal-carbon bonds in the polymeric, polyfunctional organoalkali metal compounds and it can therefore be varied as desired. Homopolymers or copolymers of the monomers mentioned can be manufactured in a similar manner. The degree of polymerization of the individual side branches is determined by the ratio of the amount of monomer employed to the number of alkali metal-carbon bonds in the polymeric, polyfunctional organoalkali metal compounds and it can therefore be selected, as desired.

The polymeric, polyfunctional organoalkali metal compounds are reacted with the reactive low molecular compounds either direct or after the reaction with the anionically polymerizable monomers. This reaction can be carried out in the same solvents as those which have served as the reaction medium for the manufacture of the polymeric, polyfunctional organoalkali metal compounds. Examples of reactive low molecular weight compounds which can be used are carbon dioxide, carbon disulfide and halogen-substituted amines; halogens, such as bromine or iodine; and alkylene oxides. Molecular oxygen, ketones and poly-halogenated, saturated hydrocarbons, such as methylene chloride, 1,2-dibromoethane and the like are also suitable. Carbon dioxide, ethylene oxide and poly-halogenated aliphatic hydrocarbons are preferred. The reactive low molecular weight compounds are employed in such amounts that the molar ratio of alkali metal content of the polymeric, polyfunctional organoalkali metal compound to the reactive low molecular weight compound is equal or less than 1:1. The reaction is carried out at temperatures from 0° to 100°C, preferably from 20° to 80°C, in an inert gas atmosphere and with exclusion of moisture. After hydrolysis or the addition of an acid compound, the reaction products are isolated in the conventional manner.

Polymeric compounds which have functional end groups, for example carboxyl, hydroxyl, amine or halogen end groups are obtained in this way. Since the number of functional end groups in the polymeric compounds corresponds to the number of alkali metal-carbon bonds in the polymeric, polyfunctional organoalkali metal compounds, it can, accordingly, be varied as desired.

The polymeric compounds which have functional end groups are distinguished by the multiplicity of their applications. Thus they can be employed, for example, as surface-active substances, such as emulsifiers, or as secondary dispersions or secondary dispersing agents. The functional groups also enable them to take part in further reactions. As an example of this, the reaction between polymers which have hydroxyl end groups and diisocyanates may be mentioned.

The use of the polymeric compounds, according to the invention, which have functional end groups as polymeric carrier substances represents a further field of application. Compared with the carriers higherto used, they have the advantage that the functional groups have approximately equal reactivity. Both soluble and crosslinked compounds of a macro-gel nature can be employed as carrier substances. Polymeric compounds which have —$CH_2$—Cl end groups, which are obtained, for example, if the polymeric, polyfunctional organoalkali metal compounds are reacted with methylene chloride, for example, are, inter alia, suitable carrier substances for the synthesis of peptides by the Merrifield method.

The invention is illustrated by the examples which follow, but is in no way restricted thereto. Unless otherwise specified, all parts and percentages are by weight.

The number-average molecular weight $\overline{M}_n$ is obtained by determining the osmotic pressure. The weight-average molecular weight $\overline{M}_w$ is determined by the light scattering method. The literature provides adequate descriptions of how to carry out these methods of analysis. The intrinsic viscosity $[\eta]$ is determined in solution in toluene at 25°C. For the determination of the limiting viscosity of the polyfunctional alkali metal-organic compounds, the latter must, beforehand, be deactivated by the addition of acid compounds.

EXAMPLE 1

930 ml of toluene (distilled over butyl lithium) and 20 ml of anhydrous tetrahydrofuran are introduced, whilst excluding atmospheric oxygen and moisture, into a two liter 4-necked flask, equipped with a stirrer, which has been cleaned by thorough heating, and flushed with very pure nitrogen. 25 g of technical-grade divinylbenzene which contains 50% of divinylbenzene and 50% of ethylvinylbenzene and which has beforehand been distilled in vacuo over calcium hydride, are added and 22.5 ml of a 1.5 molar solution of n-butyl lithium in hexane are added to the mixture at 0°C. The reaction solution, which is an intense red color, is slowly brought to room temperature and stirred for 10 hours. After the reaction is complete, 60 g of dry methylene chloride are added to the red solution of polymer, which is instantly decolorized. The chlorine-containing polymer is precipitated by pouring the solution into a five-fold amount of methanol, and is filtered off and dried in vacuo.

This gives a polydivinylbenzene micro-gel, containing chlorine, with the following characteristics:

$$\overline{M}_w = 7.5 \times 10^6$$

$$[\eta] = 33 \text{ cm}^3/\text{g}$$

The number of active lithium-carbon bonds per molecule before the reaction with methylene chloride was 4,500.

The chlorine content of the polydivinylbenzene micro-gel after the reaction with the methylene chloride was determined, by elementary analysis, as 2.03%, which corresponds to 4,300 chlorine atoms per molecule.

EXAMPLE 2

700 ml of toluene (distilled over butyl lithium) and 2 ml of anhydrous ethylene glycol dimethyl ether are introduced, whilst excluding atmospheric oxygen and moisture, into a two liter 4-necked flask, equipped with a stirrer, which has been cleaned by thorough heating, and flushed with very pure nitrogen. A mixture of 25 ml of styrene and 12.5 ml of pure meta-divinylbenzene, both of which had beforehand been distilled in vacuo over calcium hydride, is added and 18 ml of a 1.86 molar solution of n-butyl-lithium in hexane are added to the mixture at 0°C. The reaction solution, which is in an intense red color, is slowly brought to room temperature and stirred for 10 hours. When the solution has finished reacting, it is divided into two parts, A and B.

Part A of the solution (50% of the total amount) is intended for analytical purposes; it is precipitated in methanol and then dried in vacuo. This gives a polystyrene-poly-m-divinylbenzene micro-gel with the following characteristics:

$\overline{M}_w = 80,000$ $[\eta] = 5.5 \text{ cm}^3/\text{g}$.

The number of active lithium-carbon bonds per molecule is 50.

Part B of the solution (50% of the total amount) is introduced, at +10°C, into a dry two liter 4-necked flask, flushed with nitrogen and containing 300 ml of dry toluene, whilst stirring. After careful warming to 30°C, the polymerization is started. Thereafter, the mixture must be cooled in order to remove the heat of reaction. The polymerization is complete after 5 hours. In order to introduce hydroxyl groups into the star-shaped polymer, dry ethylene oxide is passed in until the polymer solution is completely decolorized. The polymer is precipitated by pouring the mixture into a five-fold amount of acidified methanol and is filtered off and dried in vacuo.

This gives a polymeric compound which has terminal hydroxyl groups with the following characteristics:

$\overline{M}_w = 240,000$ $[\eta] = 4 \text{ cm}^3/\text{g}$

Number of star branches per molecule = 50
$\overline{M}_w$ of a star branch = 3,000.

The number of terminal hydroxyl groups per molecule was determined titrimetrically by the method of Bryant and Smith (cf. D. M. Smith, W. M. D. Bryant, Journal of American Chemical Society, 47, 61 (1935)) and was found to be 45.

EXAMPLE 3

The procedure followed was as described in Example 1, but in this case, instead of the methylene chloride, 1.3 g of anhydrous carbon dioxide in solid form (dry ice) was added in small portions to the intensely red reaction solution. The decolorised reaction solution was worked up in the conventional way. The polycarboxylic acid obtained had $\overline{M}_w = 7.5 \times 10^6$. The number of active lithium-carbon bonds per molecule before the reaction with the $CO_2$ was found to be 4,500.

We claim:
1. A process for the manufacture of polymeric compounds which have any desired number of functional end groups which comprises: reacting polymeric organoalkali metal compounds with reactive low molecular weight compounds, wherein
I.
a. mixtures of divinylbenzene with monovinylaromatic compounds having a divinylbenzene content of from 10 to 80% by weight and
b. low molecular weight organoalkali metal compounds of up to 50 carbon atoms in the organic radical are reacted with one another in inert organic solvents forming the said polymeric organoalkali metal compounds, the content of divinylbenzene in the reaction mixture not exceeding 2.5 per cent by weight, based on the reaction mixture, and the molar ratio of divinylbenzene to the alkali metal content of the low molecular weight organoalkali metal compound being from 0.5:1 to 20:1, and thereafter
II. the polymeric organoalkali metal compounds thus obtained are reacted with the reactive low molecular weight compounds, selected from the group consisting of carbon dioxide, carbon disulfide, bromine, iodine, molecular oxygen, methylene chloride, 1,2-dibromoethane and ethylene oxide, the molar ratio of the alkali metal content of the polymeric, polyfunctional organoalkali metal compound to the reactive low molecular weight compound being equal or less than 1:1.

2. A process as set forth in claim 1 wherein said polymeric organoalkali metal compound has an intrinsic viscosity $[\eta]$ of less than 50 cm³/g, said reaction with said reactive low molecular weight compound being carried out at a temperature of about 0° to 100° C. in a moisture free inert gas atmosphere.

* * * * *